Nov. 11, 1930.  E. REUKAUF, JR  1,781,557
WINDOW SHADE
Filed June 22, 1929
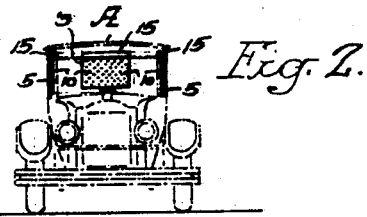
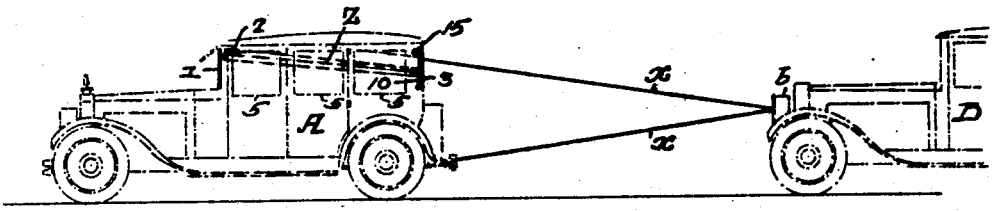
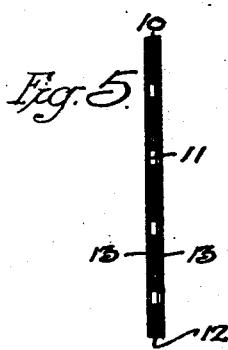
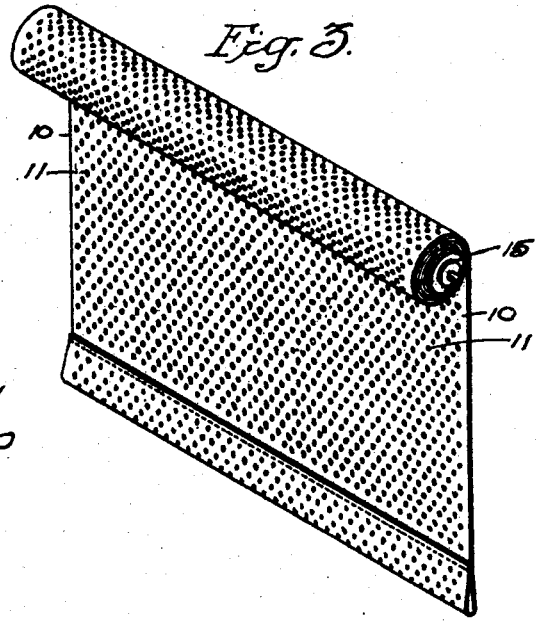
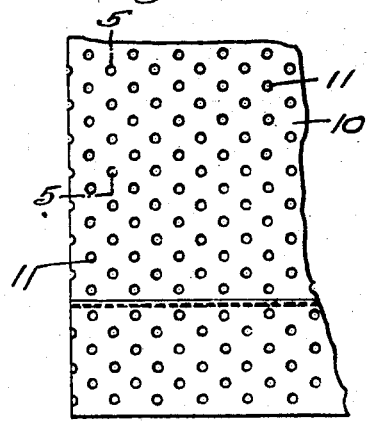
Inventor:-
Edward Reukauf Jr.,
By his Attorneys,
Howson + Howson Patented Nov. 11, 1930

1,781,557

UNITED STATES PATENT OFFICE

EDWARD REUKAUF, JR., OF PHILADELPHIA, PENNSYLVANIA, ASSIGNOR TO CAREY-McFALL CO., OF PHILADELPHIA, PENNSYLVANIA, A CORPORATION OF PENNSYLVANIA

WINDOW SHADE

Application filed June 22, 1929. Serial No. 372,917.

This invention relates to perforated window shades particularly adapted for use in automobiles and especially those of the closed-body type.

The object of the invention is to provide a window shade which, when applied to the rear window of an automobile, will prevent the objectionable glare, caused by the reflection of the head lights of a following car, in the rear-vision mirror and the windshield of the leading automobile to which the shade is applied.

The shade made in accordance with the principles of my invention is also applicable to the side windows of an automobile to prevent the glare of the head lights of an automobile approaching from either side, in the side windows of the equipped machine, and for similar purposes, such, for example, as the exclusion of sun glare, at the same time permitting air to pass through the shade.

The perforations in the shade are of such size and the distribution of the perforations is such that sufficient light will be permitted to pass through the shade and reflect in the rear-vision mirror to warn the operator of the car, so equipped, that another car is following, but at the same time the amount of light permitted to pass through the shade is not sufficient to create the well known and greatly objectionable glare in the rear-vision mirror.

Referring to the drawings:

Fig. 1 is a diagrammatic side view showing two automobiles, one following the other, the rearmost car having the head lights turned on as in night driving and the foremost automobile equipped with an antiglare curtain made in accordance with the principles of my invention, located adjacent the rear window;

Fig. 2 is a diagrammatic front view of the leading automobile of the closed-body type shown in Fig. 1 and illustrating the side and rear windows thereof equipped with perforated curtains made in accordance with the principles of my invention;

Fig. 3 is a perspective view of the curtain or shade;

Fig. 4 is a fragmentary face view showing the perforations approximately full sized and the distribution of the perforations in accordance with the preferred form of the invention; and Fig. 5 is a more or less diagrammatic sectional view taken on the line 5—5, Fig. 4.

In Fig. 1, there are two automobiles illustrated and indicated by the reference characters A and B respectively. In the leading car A the windshield is indicated at 1, the rear-vision mirror, which is located above the windshield, is indicated at 2, and the rear window of the car is indicated at 3. The following car is indicated at B, the head lights $b$ of which are turned on, as in night driving, and casting a strong ray of light included between the heavy full lines $x$, $x$, which is shown as passing through the rear window 3 of the leading car A.

Immediately adjacent the rear window 3 is an antiglare curtain 10 made in accordance with the principles of my invention, which is shown in detail in Figs. 3, 4 and 5, wherein the shade 10 is shown as being provided with a plurality of perforations 11, 11 which, in the present instance, are indicated as being circular in shape, the perforations being located at the intersections of lines extending at angles with respect to the side edges of the curtain 10. However, these perforations may be of any desired configuration and the distribution of the perforations may be of any desired form, for example, the perforations may be so arranged as to depict the outline of some particular design on the curtain without departing from the essential feaures of the invention.

The shade or curtain 10 may be made of any suitable material, and I prefer to use ordinary woven material commonly used for shades for automobiles, comprising a web of fabric 12 coated on either one or both sides with a suitable material indicated at 13 in Fig. 5, the whole constituting the curtain which may be readily wound and unwound on a roller 15 which is adapted to be hung in the usual form of brackets located adjacent the upper corners of the window to which the shade is applied. The coating 13 is especially desirable, when woven textile fabric is used as a base, to prevent raveling or loose ends around the perforations and permitting the perforations to be of a clean-cut outline.

With this construction the strong glare of the head lights of the following car B will be prevented from striking the rear-vision mirror 2 and the windshield 1 of the leading car A, permitting only subdued rays, such as indicated by the light dotted lines, Z, to pass through the curtain 10 and impinge against the windshield 1 and rear-vision mirror 2, these delicate rays being sufficient to warn the operator of the car A that another car, such as indicated at B, is following.

In Fig. 2, the curtain 10 is shown as being applied to the side windows 5, 5 of the automobile A, for excluding the glare of head lights of machines approaching from either side, in night driving, and to exclude sun glare in daylight driving.

I have found, by experiment, that if the perforations are of relatively small size, for example, one-sixteenth of an inch in diameter or its equivalent in area, and the distribution of the perforations is such that the sum of the areas of the perforations are approximately twenty-five percent of the area of the curtain, or less, and that if each perforation is surrounded by an imperforate area substantially three times as great as the area of the perforation the glare of the head lights of an approaching car is reduced to such an extent that it does not produce an objectionable glare in the rear-vision mirror and the windshield, or other light-reflecting surfaces within the car, so equipped, and that with this percentage of opening, when the curtain is used on the side windows in daylight driving, the sun glare is eliminated and the curtain permits the passage of sufficient air to the interior of the car to render the interior of the car comfortable.

While I have given an approximate proportion between the areas of the openings and the surrounding imperforate areas of the curtain, obviously this proportion may be changed to suit the desires of those employing such curtains, without departing from the spirit of the invention.

I prefer to use an opaque curtain to exclude all light except that which passes through the perforations formed in the curtain, however, a semi-transparent curtain may be used which will increase the amount of light entering the automobile from outside sources above that which enters through the perforations.

I claim:

1. A window shade disposed adjacent the rear window of an automobile and provided with a plurality of relatively small perforations distributed over its area to permit only a relatively small portion of light from the window to enter the automobile.

2. A window shade disposed adjacent the rear window of an automobile and provided with a plurality of relatively small perforations distributed uniformly over its area to permit only a relatively small portion of light from the window to enter the automobile.

3. A window shade disposed adjacent the rear window of an automobile and provided with a plurality of relatively small perforations distributed over its area in such relation with respect to each other that each perforation is surrounded by an imperforate area substantially three times as great as the area of the perforation to permit only a relatively small portion of light from the window to enter the automobile.

4. A window shade composed of a fibrous base coated with a non-fibrous substance and provided with a plurality of relatively small perforations distributed over its area.

5. A window shade composed of a flexible woven fabric coated on either side with a flexible non-fibrous substance and provided with a plurality of relatively small perforations distributed over its area.

6. In an automobile, a curtain disposed adjacent a window thereof provided with a plurality of relatively small openings distributed over its area for admitting only a minor portion of an exterior light passing through the window to enter the interior of the automobile.

7. In an automobile having rear and side windows, a curtain for each of said windows and adapted to cover the window with which it is associated, said curtain having a plurality of perforations distributed over its area, for permitting only a relatively small portion of an exterior light passing through said window to enter the interior of the automobile.

8. In an automobile having a rear window and a rear-vision mirror located within the automobile in such a position relative to said window as to reflect light rays passing to the interior of the automobile through said window, a perforated curtain intermediate said window and said rear-vision mirror, adapted to permit but a relatively small portion of the light rays to impinge upon said mirror.

9. In an automobile having a rear window and a rear-vision mirror located within the automobile in such a position relative to said window as to reflect light rays passing to the interior of the automobile through said window, a perforated curtain located immediately adjacent the rear window permitting only a relatively small portion of the light rays to impinge upon said mirror.

EDWARD REUKAUF, Jr.